United States Patent
Senda

(10) Patent No.: US 7,574,619 B2
(45) Date of Patent: Aug. 11, 2009

(54) APPARATUS, METHOD, AND PROGRAM FOR SELECTING AN ENERGY-SAVING COMMUNICATION SPEED IN A NETWORK COMMUNICATION APPARATUS

(75) Inventor: Shigeya Senda, Shizuoka (JP)

(73) Assignee: Ricoh Company, Limited, Tokyo (JP)

( * ) Notice: Subject to any disclaimer, the term of this patent is extended or adjusted under 35 U.S.C. 154(b) by 420 days.

(21) Appl. No.: 11/276,492

(22) Filed: Mar. 2, 2006

(65) Prior Publication Data
US 2006/0212730 A1 Sep. 21, 2006

(30) Foreign Application Priority Data

Mar. 18, 2005 (JP) ............................. 2005-080179
Dec. 27, 2005 (JP) ............................. 2005-375830

(51) Int. Cl.
G06F 1/00 (2006.01)
G06F 1/26 (2006.01)
G06F 1/32 (2006.01)
G06F 15/16 (2006.01)

(52) U.S. Cl. ...................... 713/322; 713/300; 713/320; 709/233

(58) Field of Classification Search ................. 713/300, 713/320, 322; 709/233
See application file for complete search history.

(56) References Cited

U.S. PATENT DOCUMENTS

| | | | |
|---|---|---|---|
| 6,075,547 A | 6/2000 | Takeuchi | |
| 6,141,352 A * | 10/2000 | Gandy | 370/463 |
| 6,442,174 B1* | 8/2002 | Lin | 370/466 |
| 6,457,055 B1* | 9/2002 | Hwong et al. | 709/227 |
| 6,791,942 B2* | 9/2004 | Jin | 370/229 |
| 2002/0097423 A1* | 7/2002 | Qiao | 358/1.14 |
| 2003/0110270 A1* | 6/2003 | Copp | 709/228 |
| 2004/0003296 A1* | 1/2004 | Robert et al. | 713/300 |
| 2005/0055456 A1* | 3/2005 | Chalupsky et al. | 709/233 |
| 2005/0216776 A1 | 9/2005 | Watanabe | |

FOREIGN PATENT DOCUMENTS

JP 2001-154763 6/2001

* cited by examiner

Primary Examiner—Thomas Lee
Assistant Examiner—Ji H Bae
(74) Attorney, Agent, or Firm—Oblon, Spivak, McClelland, Maier & Neustadt, P.C.

(57) ABSTRACT

A network communication apparatus includes: a self-apparatus setting unit that sets a communication speed to be applied to communications between the network communication apparatus itself and another apparatus that is connected to the network communication apparatus via a network; and a counterpart-apparatus setting unit that transmits and receives a speed at which communications can be performed between the network communication apparatus and the apparatus connected to the network communication apparatus, so as to set the communication speed set by the self-apparatus setting unit to a communication speed of the apparatus.

8 Claims, 9 Drawing Sheets

FIG.5

| Tag | (Description) |
|---|---|
| BMCR | (Basic Mode Control Register) |
| BMSR | (Basic Mode Status Register) |
| PHYIDR1 | (PHY Identifier Register #1) |
| PHYIDR2 | (PHY Identifier Register #2) |
| ANAR | (Auto-Negotiation Advertisement Register) |
| ANLPAR | (Auto-Negotiation Link Partner Ability Register) |
| ANER | (Auto-Negotiation Expansion Register) |
| ANNPTR | (Auto-Negotiation Next Page TX) |
| ANNPRR | (Auto-Negotiation Next Page RX) |
| 1KTCR | (1000 BASE-T Control Register) |
| 1KSTSR | (1000 BASE-T Status Register) |
| Reserved | (Reserved) |
| 1KSCR | (1000 BASE-T Extended Status Register) |
| STRAP_REG | (Strap Options Register) |
| LINK_AN | (Link and Auto-Negotiation Status Register) |
| AUX_CTRL | (Auxiliary Control Register) |
| LED_CTRL | (LED Control Register) |
| INT_STATUS | (Interrupt Status Register) |
| INT_MASK | (Interrupt Mask Register) |
| EXP_MEM_CTL | (Expanded Memory Access Control) |
| INT_CLEAR | (Interrupt Clear Register) |
| BIST_CNT | (BIST Counter Register) |
| BIST_CFG1 | (BIST Configuration Register #1) |
| BIST_CFG2 | (BIST Configuration Register #2) |
| Reserved | (Reserved) |
| EXP_MEM_DATA | (Expanded Memory Data) |
| EXP_MEM_ADD | (Expanded Memory Address) |
| PHY_SUP | (PHY Support Register) |

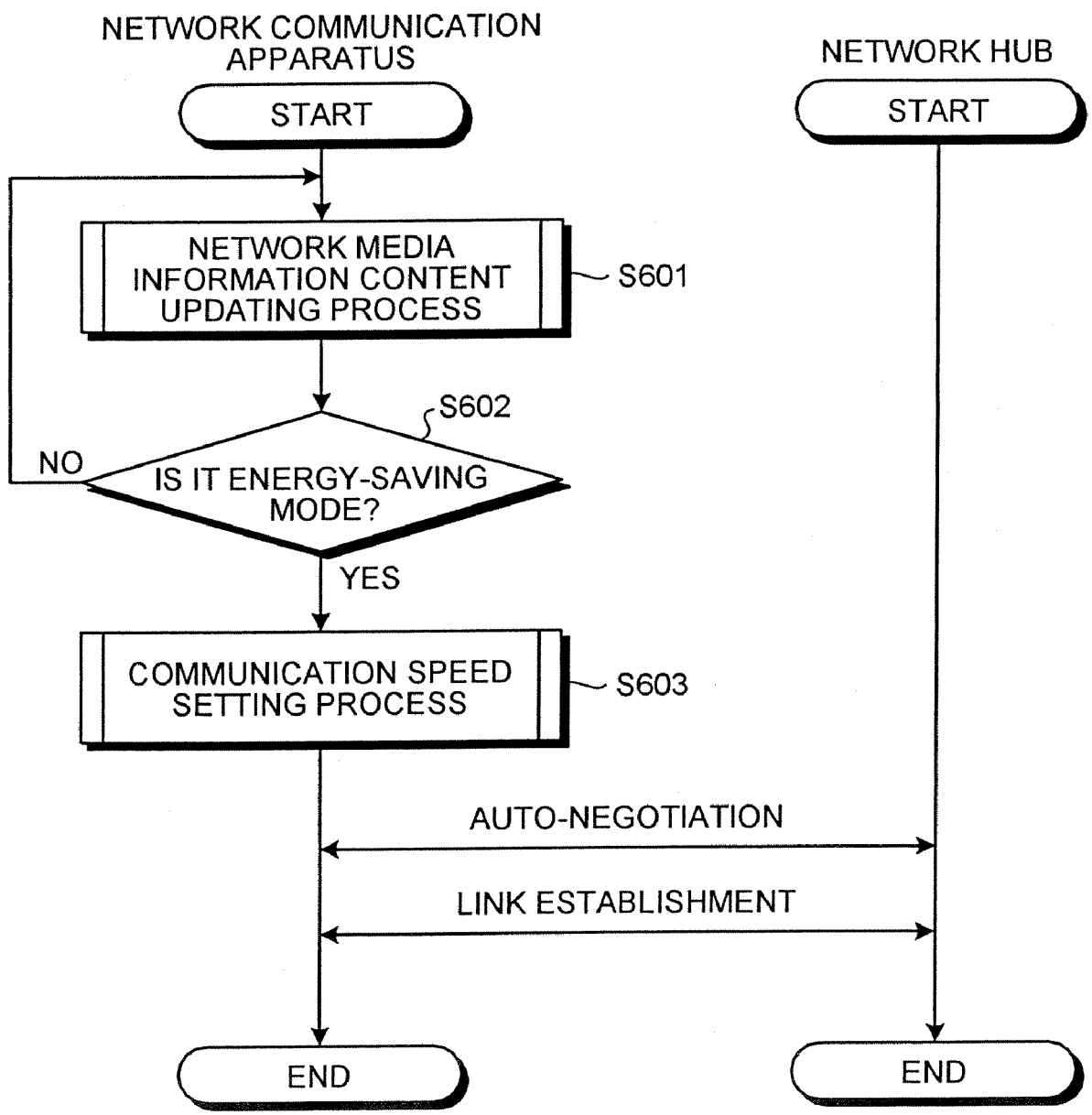

APPARATUS, METHOD, AND PROGRAM FOR SELECTING AN ENERGY-SAVING COMMUNICATION SPEED IN A NETWORK COMMUNICATION APPARATUS

CROSS-REFERENCE TO RELATED APPLICATIONS

This application is based upon and claims the benefit of priority from Japanese Patent Application No. 2005-080179, filed Mar. 18, 2005 and No. 2005-375830, filed Dec. 27, 2005, the entire contents of which are incorporated herein by reference.

BACKGROUND OF THE INVENTION

1. Field of the Invention

The present invention relates to a network communication apparatus having a function of communicating with other devices via a network, an image forming apparatus, a method of controlling the network communication apparatus, and a program for making a computer function as the network communication apparatus.

2. Description of the Related Art

It has been conventionally proposed to decrease power consumption of a network communication apparatus having a function of communicating with other devices via a network, by decreasing a communication speed of the apparatus at the time of shifting to an energy-saving mode.

This technique is described in Japanese Patent Application Laid-open No. 2001-154763, for example.

However, according to an energy-saving communication apparatus described in Japanese Patent Application Laid-open No. 2001-154763, at the time of shifting to an energy-saving mode, only an instruction to decrease the speed of communicating with an external device is written in a speed-setting internal register. According to this method, however, at the time of actually communicating with another device, the communication apparatus becomes in a state of a connection failure, if the communication speed of the other device remains unchanged. Therefore, the communication apparatus described in Japanese Patent Application Laid-open No. 2001-154763 has the problem that the communication speed cannot be properly changed at the time of shifting to the energy-saving mode.

SUMMARY OF THE INVENTION

It is an object of the present invention to at least solve the problems in the conventional technology.

According to one aspect of the present invention, a network communication apparatus includes: a self-apparatus setting unit that sets a communication speed to be applied to communications between the network communication apparatus itself and another apparatus that is connected to the network communication apparatus via a network; and a counterpart-apparatus setting unit that transmits and receives a speed at which communications can be performed between the network communication apparatus and the another apparatus, and that sets the communication speed set by the self-apparatus setting unit to a communication speed of the another apparatus.

According to another aspect of the present invention, an image forming apparatus includes the network communication apparatus, which network communication apparatus including the above-explained self-apparatus setting unit and the counterpart-apparatus setting unit.

According to still another aspect of the present invention, a method of executing network communication includes: setting by use of a self-apparatus setting unit a communication speed to be applied to communications between a network communication apparatus to which the self-apparatus setting unit belongs and another apparatus that is connected to the network communication apparatus via a network; and transmitting and receiving a speed at which communications can be performed between the network communication apparatus and the another apparatus to set the communication speed previously set by the self-apparatus setting unit to a communication speed of the another apparatus.

According to still another aspect of the present invention, a computer-readable recording medium stores therein a computer program that causes a computer to implement the above method.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 5 is an explanatory diagram of the contents in the control registers;

FIG. 6 is a flowchart of a communication speed change process performed by a network communication apparatus and a network hub;

DETAILED DESCRIPTION OF THE PREFERRED EMBODIMENTS

Exemplary embodiments for implementing the present invention are explained below in detail with reference to the accompanying drawings.

Figure 1:
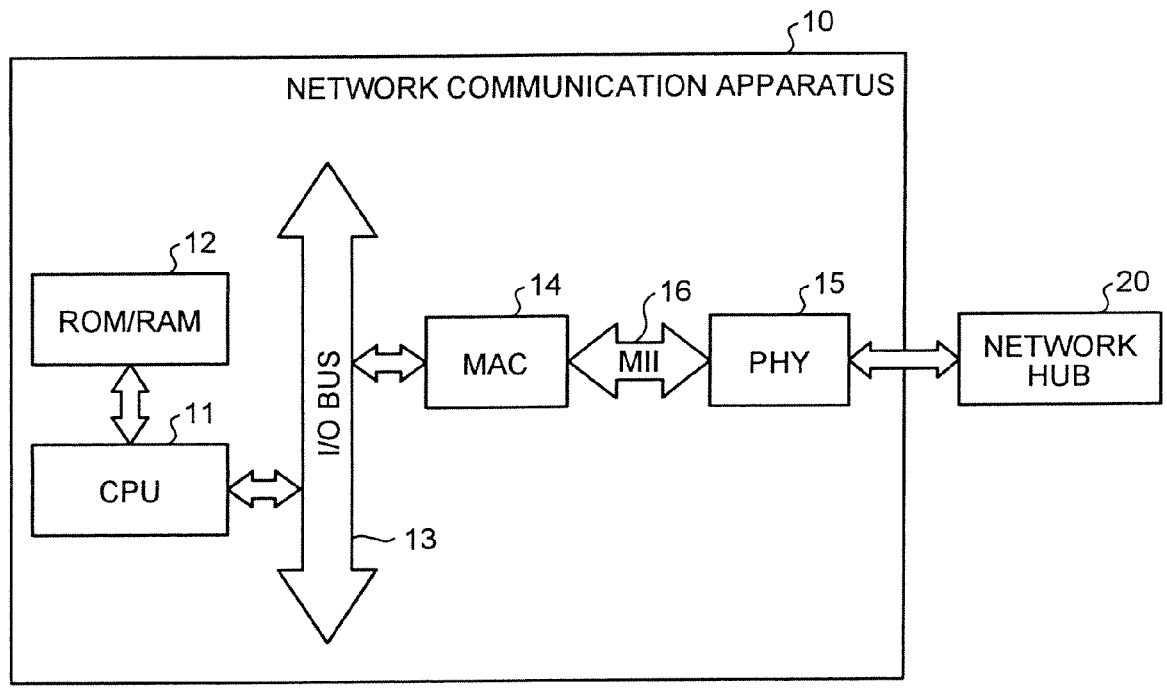
FIG. 1 is a configuration example of a network communication apparatus according to an embodiment of the present invention.

One embodiment of the present invention is explained below with reference to the drawings. FIG. 1 is a configuration example of a network communication apparatus according to the present embodiment. As shown in FIG. 1, a network communication apparatus 10 includes a central processing unit (CPU) 11, a read only memory/random access memory (ROM/RAM) 12, a media access controller (MAC) 14 and a physical layer (PHY) 15. The CPU 11 and the MAC 14 are connected to an input and output (I/O) bus 13, and the MAC 14 is connected to the PHY 15 via a media independent interface (MII) 16.

The CPU 11 is a control unit that controls the entire network communication apparatus 10. The CPU 11 executes various programs recorded in the ROM/RAM 12, and controls various parts of the network communication apparatus 10, thereby functioning as various units including an energy-saving control unit and a communication unit. Consequently, the CPU 11 achieves various functions of the embodiment as described later.

The ROM/RAM 12 is a storage unit to be used as a work memory of the CPU 11 that stores programs executed by the CPU 11, fixed parameters, and data to be used temporarily.

The MAC 14 is a control unit that controls data transfer via a network by operating the PHY 15 under the control of the CPU 11. The PHY 15 is a physical interface that exchanges a signal with the other communication apparatus. A general configuration prescribed by the Institute of Electrical and Electronic Engineers (IEEE) 802.3 can be used to connect the MAC 14 and the PHY 15 via the MII 16.

A network hub 20 relays communications between apparatuses via the network. When the network communication apparatus 10 communicates with other apparatus, the network communication apparatus 10 can be physically and directly connected to the other apparatus. Usually, the apparatus 10 is connected to the other apparatus via the network hub 20.

Figure 2:
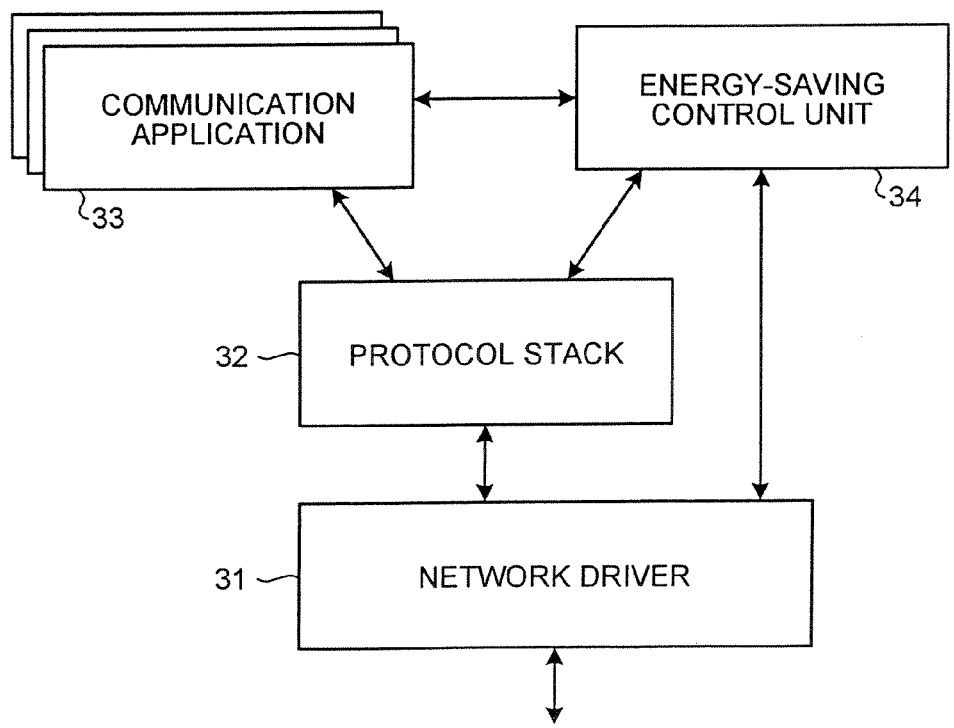
FIG. 2 depicts a part relevant to the characteristics of the embodiment, among functional configurations of the network communication apparatus according to the embodiment.

FIG. 2 depicts a part relevant to the characteristics of the embodiment, among the functional configurations of the network communication apparatus 10 shown in FIG. 1. The CPU 11 achieves each function shown in FIG. 2 by executing corresponding software. As shown in FIG. 2, the network communication apparatus 10 includes functions of a network driver 31, a protocol stack 32, a communication application 33, and an energy-saving control unit 34.

Among others, the network driver 31 has a function of controlling the MAC 14, thereby communicating at a packet level. The protocol stack 32 has a function of interpreting protocols of a transmission control protocol/Internet protocol (TCP/IP).

The communication application 33 has a function of controlling the functions that the network communication apparatus 10 usually provides, while communicating with other apparatus, via the protocol stack 32. Because the detailed content is not so relevant to the characteristics of the present embodiment, their explanation is omitted.

The energy-saving control unit 34 monitors the state of the network communication apparatus 10, and manages a shift to the energy-saving mode and a return to the normal mode. The energy-saving control unit 34 has a function of instructing a change of the mode to the network driver 31 when there is a predetermined trigger. The energy-saving control unit 34 and the network driver 31 correspond to an energy-saving controller.

The above predetermined trigger includes operation of a knob or a button (not shown), and a lapse of a predetermined time. For example, the trigger includes a switching of a mode between the energy-saving mode and the normal mode by a toggle switch, a shifting of a mode to the energy-saving mode when the apparatus is not operated for a predetermined period of time, and a return to the normal mode when there is any operation of the apparatus.

In other words, the normal mode refers to a state where the normal process is executed when the operator performs any operation within a predetermined period of time. The energy-saving mode refers to a state where power consumption is saved by stopping a predetermined range of current conduction when there is no operation within a predetermined time. In the present embodiment, a frequency of the network communication apparatus 10 is decreased to decrease power consumption, by setting a low communication speed to communications between the network communication apparatus 10 and the network hub 20.

Figure 3:
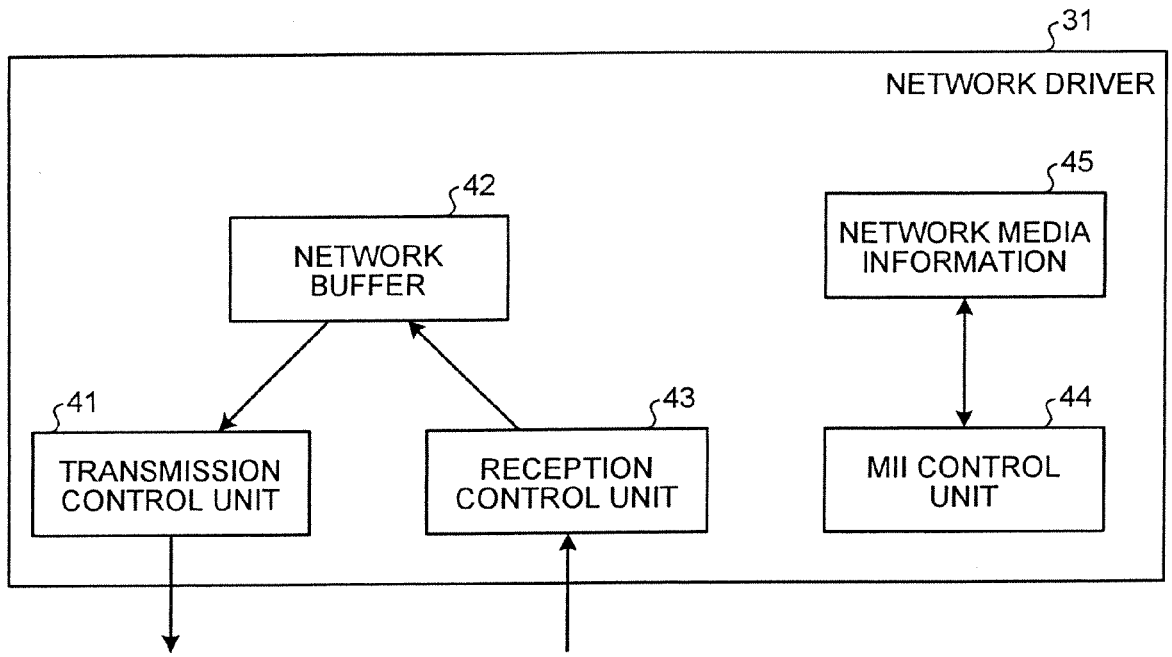
FIG. 3 depicts a detailed functional configuration of a network driver.

FIG. 3 depicts a detailed functional configuration of the network driver 31 shown in FIG. 2. As shown in FIG. 3, the network driver 31 has a transmission control unit 41, a reception control unit 43, and an MII control unit 44. The transmission control unit 41 has a function of controlling the operation of the MAC 14 that usually transmits a packet disposed in the memory area of the network buffer 42 using a direct memory access (DMA).

The reception control unit 43 has a function of controlling the reception of a packet input from the network by the DMA and writing of the packet in the memory area of the network buffer 42. The high-level protocol stack 32 interprets the content of the packet written in the network buffer 42. A packet generated by the protocol stack 32 is disposed in the network buffer 42, and is transmitted.

The MII control unit 44 has a function of controlling the PHY 15 that uses the MII 16, via the MAC 14. The MII control unit 44 also has a function of generating network media information 45 that manages the state of the PHY 15, and managing the network media information 45 based on information obtained by the MII 16.

Figure 4:
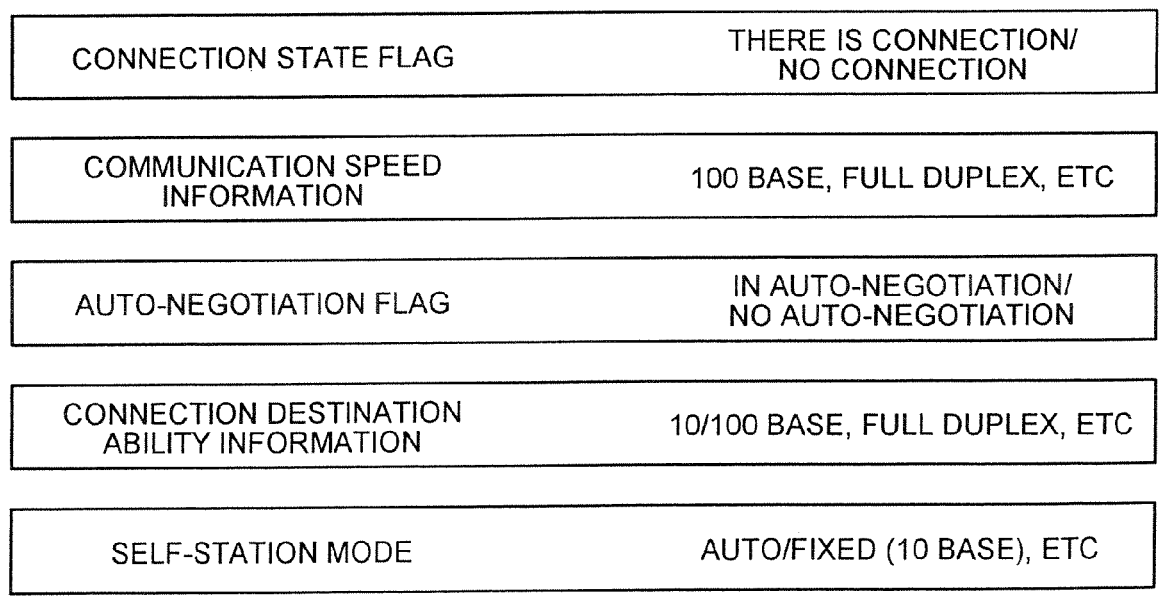
FIG. 4 is an example of the contents of network media information.

FIG. 4 depicts an example of contents of the network media information 45. As shown in FIG. 4, the MII control unit 44 manages a connection state flag, communication speed information, an auto-negotiation flag, connection destination ability information, and self-station mode information, as the network media information 45. The connection state flag manages a state whether the PHY 15 is linked to the other communication apparatus. When the PHY 15 is linked to the other communication apparatus, the connection state flag indicates "there is connection", and when the PHY 15 is not linked to the other communication apparatus, the connection state flag indicates "there is no connection".

The communication speed information is the communication speed that the PHY 15 uses to communicate with the other communication apparatus. The auto-negotiation flag manages a state whether the PHY 15 is negotiating with the other communication apparatus.

The connection destination ability information is a communication speed used by the other communication apparatus that is currently linked (or has been linked) to the PHY 15. The self-station mode is a communication speed that the PHY 15 presents at the time of connecting to the other communication apparatus. "Auto" represents auto-negotiation. A fixed value indicates that the speed is fixed to this communication speed.

FIG. 5 is an explanatory diagram of contents of control registers. The PHY 15 includes control registers such as BMCR, BMSR, PHYIDR1, PHYIDR2, ANAR, ANLPAR, ANER, and ANNPTR that are prescribed by the IEEE 802.3. The MAC 14 can access these registers from the register interface for accessing these control registers held by the PHY 15. The MAC 14 can read values of the above control registers and change these values, by accessing the MII register. The MII control unit 44 periodically accesses the PHY 15 via the MAC 14, and updates the content of the network media information 45 based on proper information of the registers by referring to an appropriate value of these registers.

The communication speed change process in the energy-saving mode performed by the network communication apparatus 10 and the network hub 20 having the above configurations is explained next. FIG. 6 is a flowchart of the communication speed change process performed by the network communication apparatus and the network hub.

The network communication apparatus 10 updates the content of the network media information at every five seconds, for example (step S601). Details of the process are explained later with reference to FIG. 7. The network communication apparatus 10 determines whether the mode is the energy-saving mode (step S602).

When it is determined that the mode is not the energy-saving mode (step S602: No), the process returns to step S601, and the network communication apparatus 10 updates the network media information. When it is determined that the mode is the energy-saving mode (step S602: Yes), the network communication apparatus 10 sets a communication speed (step S603). Details of the process are explained later with reference to FIG. 8. Accordingly, a communication speed lower than the normal communication speed that can be set to communications between the network communication apparatus 10 and the network hub 20 is set in the network communication apparatus 10.

When the network communication apparatus 10 communicates in a predetermined time loop back mode, it is determined that the communication is disconnected at the network hub 20 side, and an auto-negotiation occurs between the network communication apparatus 10 and the network hub 20. Accordingly, the communication speed of the network hub 20 can be changed to the low communication speed set in the network communication apparatus 10. A link is established between the network communication apparatus 10 and the network hub 20 at the low communication speed.

As explained above, a communication speed can be set to a low communication speed to carry out communications, by using the existing auto-negotiation function. Therefore, a low-speed process can be easily achieved in the energy-saving mode. When the process in the energy-saving mode is achieved using the existing auto-negotiation function, a low-speed process in the energy-saving mode can be achieved without generating abnormal communication. In the network communication apparatus 10, low-speed energy-saving effect occurs at the point of time when a low communication speed is set and when this is reflected to the network communication apparatus 10, that is, at the point of time when the frequency of a circuit is changed from 25 Megahertz to 5 Megahertz, for example.

Figure 7:
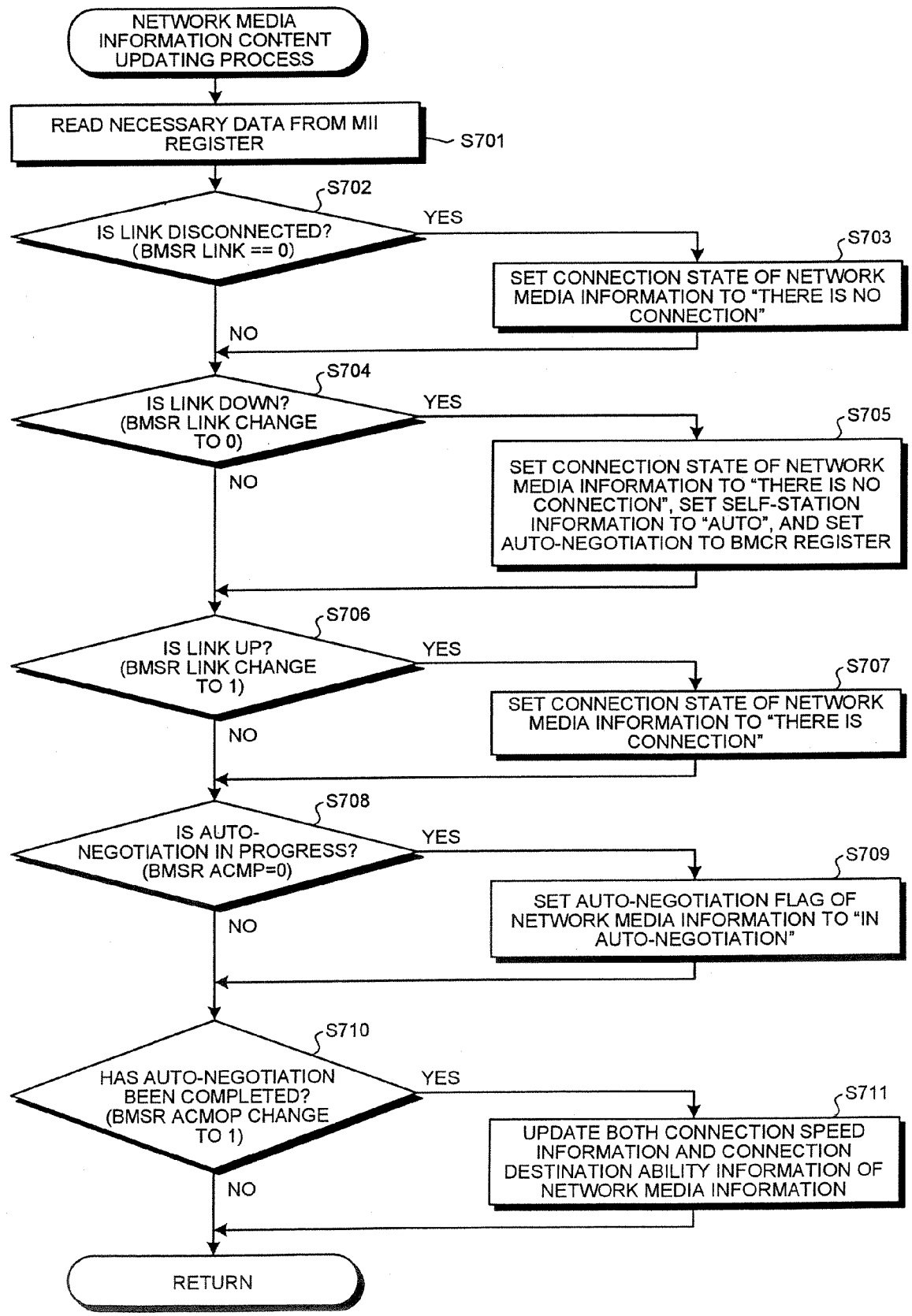
FIG. 7 is a flowchart of a process of updating the content of network media information.

FIG. 7 is a flowchart of a process of updating the content of network media information. The CPU 11 of the network communication apparatus 10 manages time with a timer, starts process shown in the flowchart of FIG. 7 at a constant time interval, such as at every few hundred milliseconds, for example, and updates the content of the network media information 45. At step S701, the CPU 11 reads necessary information from the MII register.

At step S702, the CPU 11 determines whether the link is disconnected. When the link is not disconnected, at step S703, the CPU 11 sets "there is no connection" to the connection state flag of the network media information 45, and the process proceeds to step S704. When the link is not disconnected, the process directly proceeds to step S704. Here, the CPU 11 sets YES as a result of the determination made at step S702 when the value of the bit indicating the link of the BMSR register (BMSR LINK) is continuously 0 (which indicates that the link has not been established).

At step S704, the CPU 11 determines whether the link is down. When the link is down, at step S705, the connection state flag of the network media information 45 is set to "there is no connection", the self-station information is set to "auto", and an "AUTO Enable" bit of the BMCR register is operated to set the auto-negotiation, and the process proceeds to step S706. When the link is not down, the process directly proceeds to step S706.

Here, when the BMSR LINK changes from 1 to 0, a result of the determination made at step S704 can be set to YES. In this case, the auto-negotiation is set for the following reason. Even when the communication speed is fixed in the process shown in FIG. 8 described below, once a link is down, a link is made, in some cases, by physically connecting the self apparatus to the other communication apparatus different from that before the link is down. In this case, information of that communication apparatus needs to be obtained by generating the auto-negotiation. When the link has been recovered after the link is down, a return to the normal mode can be requested to the energy-saving control unit 34, because the fact that the link has been recovered can be considered that a cable is connected with an intention of using the network communication apparatus 10.

At step S706, the CPU 11 determines whether the link is up. When the link is up, at step S707, the CPU 11 sets "there is connection" to the connection state flag of the network media information 45, and the process proceeds to step S708. On the other hand, when the link is not up, the process directly proceeds to step S708. The CPU 11 sets YES as a result of the determination made at step S706 when the BMSR LINK changes from 0 to 1 (which indicates that the link has been established).

At step S708, the CPU 11 determines whether the network communication apparatus and the network hub are in the auto-negotiation state. When a result of the determination made at step S708 is YES, the auto-negotiation flag of the network media information 45 is set to "in negotiation" at step S709, and the process proceeds to step S710. When a result of the determination made at step S708 is NO, the process directly proceeds to step S710. Here, the CPU 11 sets YES as a result of the determination made at step S708 when the value of the bit indicating whether the auto-negotiation of the BMSR register is completed (BMSR ACMOP) is continuously 0 (which indicates that the auto-negotiation has not been completed).

At step S710, the CPU 11 determines whether the auto-negotiation has been completed. When the auto-negotiation is complete, the connection speed information and the connection destination ability information are updated at step S711, and the process ends. When the auto-negotiation has not been completed, the process is continued. Here, the CPU 11 sets YES as a result of the determination made at step S710 when the BMSR ACMOP changes from 0 to 1 (which indicates that the auto-negotiation has been completed). Information to be used to update at step S711 can be obtained from the ANLPAR register and the ANLPARNP register.

Based on the above process, the MII control unit 44 can update the content of the network media information 45 to content which meets the situation of the PHY 15 at each point of time. When the process at step S705 is considered, it is preferable that the above process is performed at every sufficiently longer time than the time required for the process shown in FIG. 8.

Figure 8:
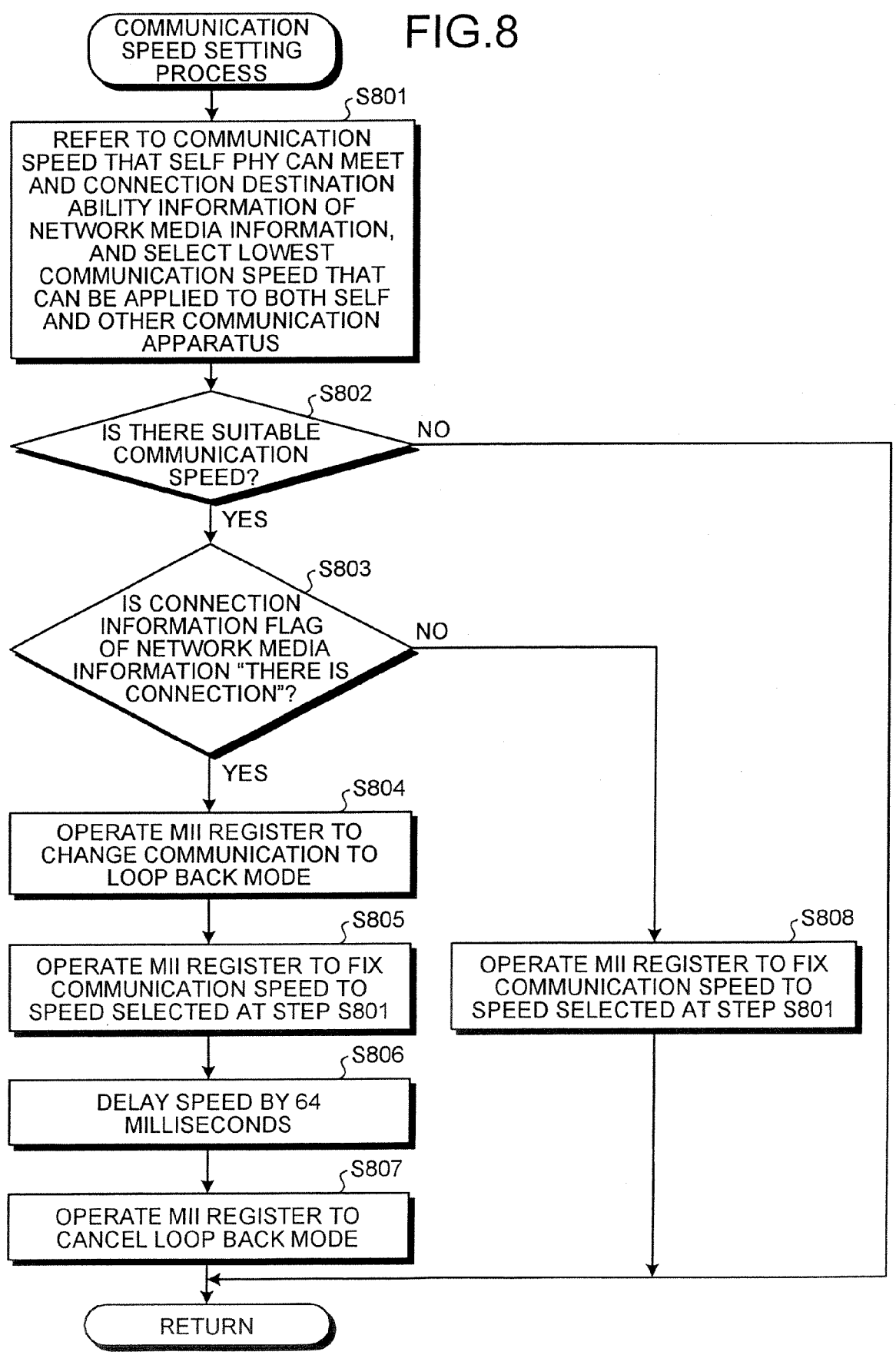
FIG. 8 is a flowchart of a process of changing the communication speed when a network communication apparatus shifts to an energy-saving mode.

FIG. 8 is a flowchart of the process of changing a communication speed that the CPU 11 performs when the network communication apparatus 10 shifts to the energy-saving mode. This process is started when the network communication apparatus 10 receives an instruction to shift to the energy-saving mode from the energy-saving control unit 34 based on the function of the network driver 31.

In this process, at step S801, the CPU 11 operating as a self-apparatus setting unit refers to the information of a communication speed that the PHY 15 can meet and the connection destination ability information of the network media information 45, and selects a slowest communication speed that can be applied to both the self apparatus and the other communication apparatus. When a communication speed slower than the communication speed in the normal mode determined by the auto-negotiation between both apparatuses is selected, the energy-saving effect can be obtained, even when this selected communication speed is not the slowest speed. At step S802, the CPU 11 determines whether a suitable communication speed is available. When a suitable communication speed is not available, the process ends. When a suitable communication speed is available, the process proceeds to step S803.

At step S803, the CPU 11 determines whether the connection information flag of the network media information 45 is "there is connection". When the connection information flag of the network media information 45 is "there is connection", the process proceeds to step S804, and the MII register is operated to change the communication to the loop back mode. The communication mode can be changed to the loop back mode by operating a predetermined bit of the BMCR register.

At step S805, the MII register is operated to fix the communication speed to the speed selected at step S801. In this case, the self-station information of the network media information 45 can be also set to the same content. Thereafter, at step S806, fix of the communication speed is delayed by 64 milliseconds. At step S807, the MII register is operated to cancel the loop back mode, and the process ends.

When there is no connection at step S803, the communication speed is fixed at step S808 in a process similar to that at step S805, and the process ends. When there is no suitable communication speed at step S802, the communication speed cannot be changed. Therefore, the process ends. When the other communication apparatus is operated in the fixed speed state, the process ends.

By performing the above process, at the time of shifting to the energy-saving mode, the communication speed is changed to a low-speed energy-saving mode at the network communication apparatus 10 side, thereby decreasing energy consumption in the energy-saving mode. The communication speed at the other communication apparatus side can be also changed to the communication speed of the network communication apparatus 10. Therefore, the communication speed can be changed without generating abnormal communication.

In other words, in a general PHY, the link signal can be disconnected by changing the mode to the loop back mode. Therefore, in changing the communication speed, the PHY 15 is once changed to the loop back mode to disconnect the link. Thereafter, the speed fix is delayed by 64 milliseconds prescribed in the IEEE 802.3 as the down time necessary, to generate the auto-negotiation. Thereafter, the loop back mode is canceled to return to the state where the link is possible again, and for establishing the link, the auto-negotiation at the other communication apparatus side can be generated.

When a low communication speed is set to the network communication apparatus 10 at this time, the low communication speed is set by the auto-negotiation by transmit and receive, thereby enabling to save energy.

When the loop back mode is used, the link can be disconnected temporarily, and the link can be recovered thereafter, based on a simple control without using special hardware. When the link is disconnected at the time of shifting to the energy-saving mode, the communication speed is changed at the network communication apparatus 10 side. With this arrangement, the low communication speed can be set by negotiation at the time of the next link.

Figure 9:
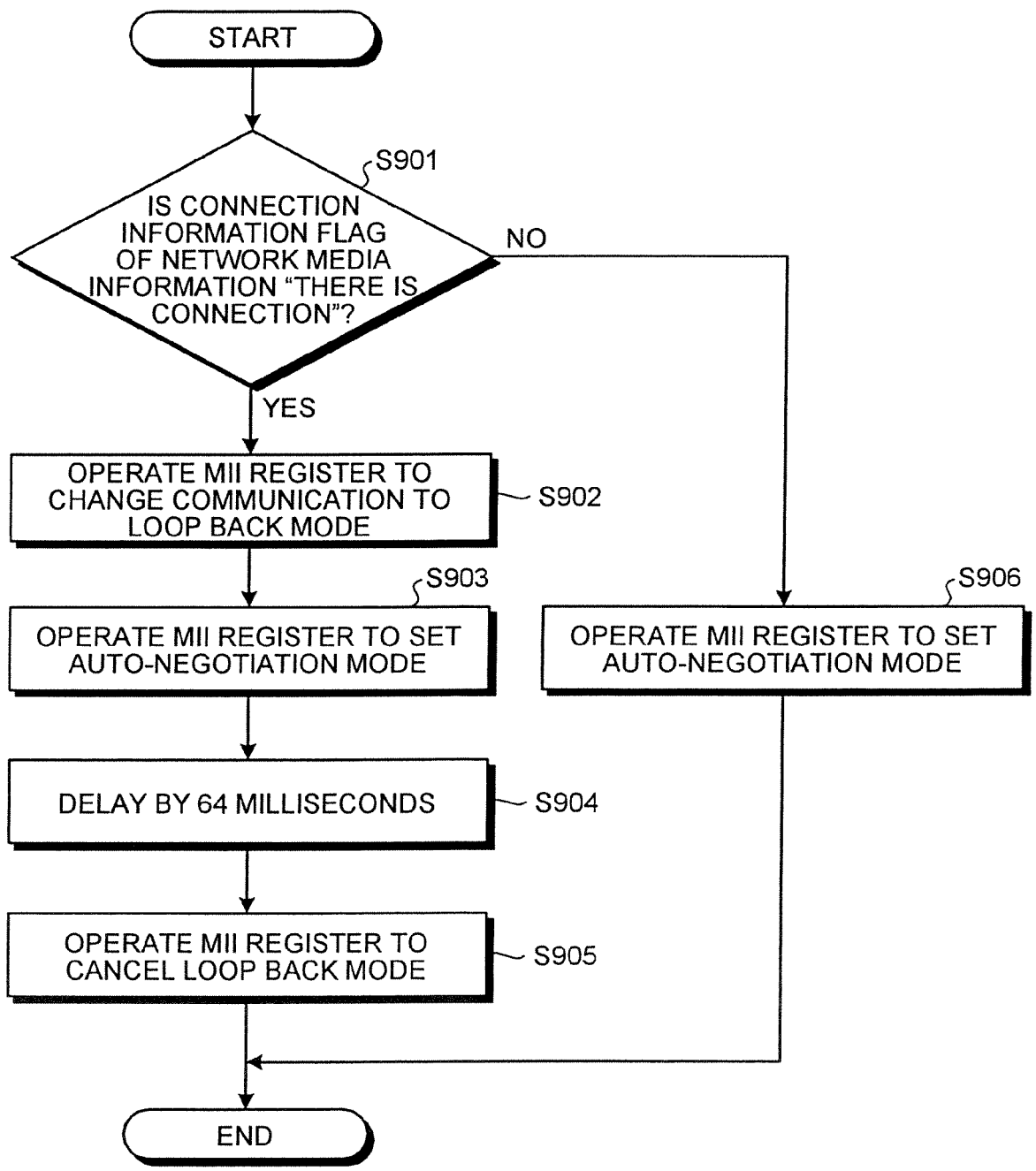
FIG. 9 is a flowchart of a process of changing the communication speed when the network communication apparatus returns to the normal mode.

FIG. 9 is a flowchart of the process of changing the communication speed by the CPU 11 when the network communication apparatus 10 returns to the normal mode. This process is started when the apparatus receives an instruction to return to the normal mode from the energy-saving control unit 34, based on the function of the network driver 31.

In this process, at step S901, the CPU 11 determines whether the connection information flag of the network media information 45 is "there is connection". When there is connection, the process proceeds to step S902, and the MII register is operated to change the communication to the loop back mode. The communication mode can be changed to the loop back mode by operating a predetermined bit of the BMCR register. At step S903, the MII register is operated to set the mode to the auto-negotiation mode. In this case, the self-station information of the network media information 45 can be also set to the same content.

Thereafter, at step S904, the communication speed resetting is delayed by 64 milliseconds. At step S905, the MII register is operated to cancel the loop back mode, and the process ends. When there is no connection at step S901, the communication speed is fixed at step S906 in a process similar to that at step S903, and the process ends.

By performing the process, at the time of returning to the normal mode, the communication speed can be quickly returned to the high communication speed, by performing the auto-negotiation between the network communication apparatus 10 and the other communication apparatus. Before performing the auto-negotiation, when the network communication apparatus 10 is returned to the state of performing the auto-negotiation, the network communication apparatus 10 and the other communication apparatus can perform the auto-negotiation to set the optimum communication speed.

The above explains the operation according to the embodiment. In the explanation, it is needless to mention that the apparatus configuration, the detailed process content, and the communication protocols used for the communication are not limited to those explained in the embodiment.

The network communication apparatus 10 can be any type of apparatus so long as the apparatus can perform communication via the network. The network communication apparatus includes image processing apparatuses such as a printer, a facsimile machine, a digital copying machine, a scanner, and a digital multifunction product, a general-purpose computer, network home electric appliances, automatic vending machines, medical instruments, power supply devices, air conditioning systems, metering devices for gas, running water, and electricity, and network communication apparatuses such as electronic devices having a network communication function in an automobile, an aircraft, or the like.

A program according to the present invention makes a computer function as an apparatus such as the network communication apparatus 10, and makes the computer achieve the control functions as explained with reference to FIGS. and 8. The computer executes the program to obtain the above effects.

The program can be stored in the ROM and the HDD that are provided in the computer at the beginning. The program can be also provided by being recorded in a compact disc read-only memory (CD-ROM), a flexible disk, a static random access memory (SRAM), an electrically erasable and programmable read-only memory (EEPROM), and a non-volatile recording medium (memory) such as a memory card. The program recorded in the memory is installed on the computer. The CPU executes the program, or the CPU reads the program from the memory to execute the program, thereby performing the above steps.

The program can be downloaded from an external apparatus that is connected to the network and has a recording medium on which the program is recorded or an external apparatus that has the program stored in the memory, and the downloaded program can be executed.

Figure 10:
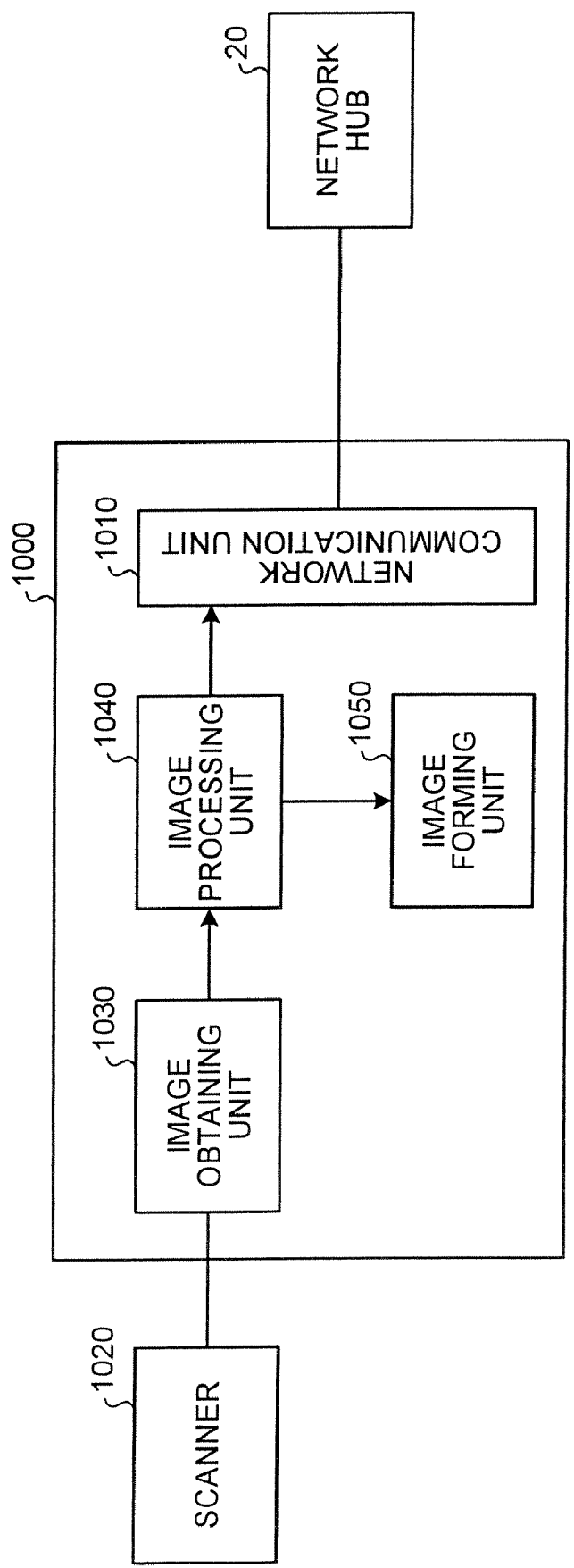
FIG. 10 is a block diagram of a configuration of a multi-function product according to the embodiment.

Another embodiment of the present invention is explained with reference to the accompanying drawings. An example of a configuration of a multifunction product that includes the network communication apparatus according to the embodiment is explained. FIG. 10 is a block diagram of a configuration of a multifunction product according to the embodiment. A multifunction product 1000 according to the present embodiment includes a scanner 1020, an image obtaining unit 1030, an image processing unit 1040, an image forming unit 1050, and a network communication unit 1010.

The scanner 1020 reads a document, and generates image information. The image obtaining unit 1030 obtains image information generated by the scanner 1020. The image processing unit 1040 performs various image processes to the image information obtained by the image obtaining unit 1030. The image forming unit 1050 generates a toner image from the image information processed by the image processing unit 1040, and outputs the toner image to a transfer medium.

The network communication unit 1010 transmits image information obtained by the image obtaining unit 1030 to other multifunction products and other printers via the network hub. The network communication unit 1010 also receives image information transmitted from another information terminal. The network communication unit 1010 changes the communication speed to a low speed at the energy-saving time, and includes functions and a configuration similar to those of the network communication apparatus 10. These functions explained above are not explained here. The configuration and functions of the network hub 20 are similar to those explained above, and their explanation is omitted.

As explained above, when the image forming apparatus such as a multifunction product and a printer according to the present embodiment are connected to the network and also when the image forming apparatus has shifted to the energy-saving mode, the communication speed can be quickly changed to the low speed without generating abnormal communication. Therefore, energy consumption can be decreased easily.

Figure 11:
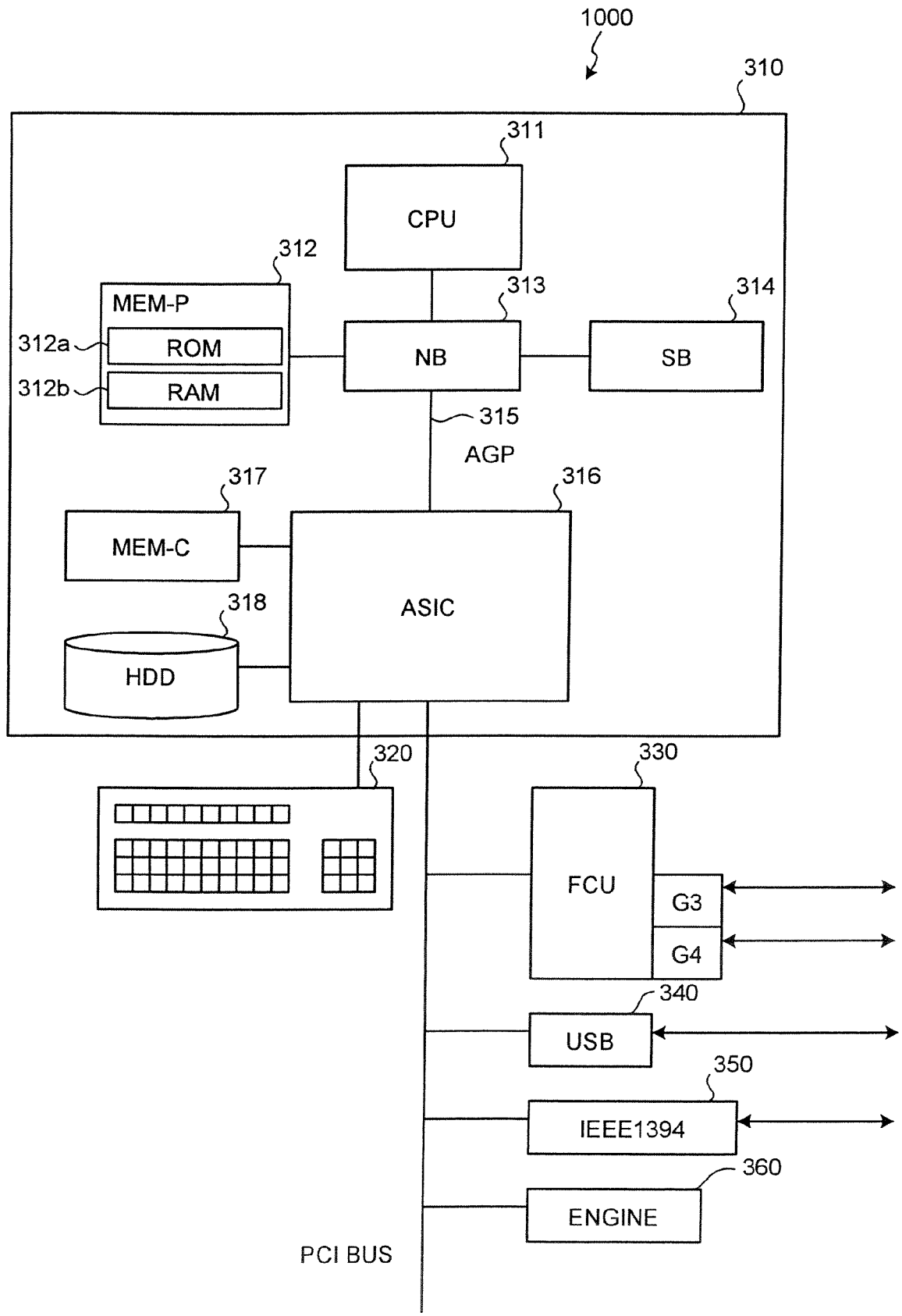
FIG. 11 is a block diagram of a hardware configuration of the multifunction product according to the embodiment.

FIG. 11 is a block diagram of a hardware configuration of the multifunction product according to the present embodiment. The multifunction product 1000 has a controller 310 and an engine 360 connected to each other via a peripheral component interconnect (PCI) bus. The controller 310 controls the entire multifunction product 1000 and image drawing and communications, and controls an input from an operating unit (not shown). The engine 360 is a printer engine that can be connected to the PCI bus, and includes a white and black plotter, a one-drum color plotter, a four-drum color plotter, a scanner and a facsimile unit and the like. The engine 360 also includes an image processing unit that executes error dispersion and a gamma conversion, in addition to the engine part of the plotter.

The controller 310 includes a CPU 311, a north bridge (NB) 313, a system memory (MEM-P) 312, a south bridge (SB) 314, a local memory (MEM-C) 317, an application specific integrated circuit (ASIC) 316, and a hard disc drive (HDD) 318. The north bridge (NB) 313 and the ASIC 316 are connected to each other via an accelerated graphics port (AGP) bus 315. The MEM-P 312 includes a read-only memory (ROM) 312a and a random access memory (RAM) 312b.

The CPU 311 controls the entire multifunction product 1000, has a chip set including the NB 313, the MEM-P 312, and the SB 314, and is connected to other apparatus via this chip set.

The NB 313 connects the CPU 311 to the MEM-P 312, the SB 314, and the AGP 315, respectively, and has a memory controller that controls writing to the MEM-P 312, a PCI master, and an AGP target.

The MEM-P 312 is a system memory that is used as a memory that stores a program and data, a memory that develops a program and data, and a drawing memory of a printer, and includes the ROM 312a and the RAM 312b. The ROM 312a is a read-only memory that stores a program and data. The RAM 312b is a writable and readable memory that is used as a memory data develops a program and data and drawing memory of a printer.

The SB 314 is a bridge that connects the NB 313 with a PCI device and a peripheral device. The SB 314 is connected to the NB 313 via the PCI bus. A network interface (I/F) is also connected to the PCI bus.

The ASIC 316 is an integrated circuit (IC) for image process having an image processing hardware element, and has a role of a bridge that connects the AGP 315, the PCI bus, the HDD 318, and the MEM-C 317 to each other. The ASIC 316 includes a PCI target, an AGP master, an arbiter (ARB) that forms a core of the ASIC 316, a memory controller that controls the MEM-C 317, plural direct memory access controllers (DMAC) that carry out rotation of an image based on a hardware logic, and a PCI unit that carries out a data transfer to the engine 360 via a PCI bus. The ASIC 316 is connected to a facsimile control unit (FCU) 330 which controls transmission of data switching between two protocols G3 and G4, a universal serial bus (USB) 340, and the IEEE 1394 interface 350, via the PCI bus.

The MEM-C 317 is a local memory that is used as a copy image buffer and a coding buffer. The hard disc drive (HDD) 318 is a storage device that stores image data, stores a program, stores font data, and stores a form.

The AGP 315 is a graphics accelerator card bus interface that is proposed to be used to increase a graphic processing speed. The AGP 315 directly accesses the MEM-P 312 at a high throughput to increase the speed of the graphics accelerator card.

The network communication control program that is executed by the multifunction product 1000 according to the present embodiment is provided by being stored in the ROM in advance.

The network communication program that is executed by the multifunction product 1000 of the present embodiment can be provided by being stored in a computer-readable recording medium such as a CD-ROM, a flexible disk (FD), a CD recordable (CD-R), and a digital versatile disk (DVD), in an installable or executable format file.

The network communication program that is executed by the multifunction product 1000 of the present embodiment can be stored in a computer that is connected to a network such as the Internet, and the program can be provided by being downloaded via the network. The network communication program that is executed by the multifunction product 1000 of the present embodiment can be provided or distributed via a network such as the Internet.

The network communication program that is executed by the multifunction product 1000 of the present embodiment has a module configuration that includes the above units such as the network communication unit. As actual hardware, the CPU (processor) reads the network communication program from the ROM and executes the program, thereby loading each unit on the main storage device and generating a network communication unit on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network communication apparatus comprising:
   a self-apparatus setting unit that sets a communication speed to be applied to communications between the network communication apparatus itself and another apparatus that is connected to the network communication apparatus via a network;
   an auto-negotiation unit that transmits and receives a speed at which communications can be performed between both the network communication apparatus and said another apparatus, and that sets the communication speed set by the self-apparatus setting unit to a communication speed of said another apparatus;
   an update unit that updates the communication speed, and that updates a connection destination ability of network media information, after completion of transmitting and receiving by the auto-negotiation unit;
   an energy-saving mode unit that selects an energy-saving communication speed based on a speed that the self-apparatus can meet and on the connection destination ability of network media information; and
   a disconnecting unit configured to disconnect a link between the network communication apparatus and said another apparatus, wherein the disconnecting unit shifts a physical layer to a loop back mode that is a state where data is transmitted to the network communication apparatus itself, thereby disconnecting the link.

2. The network communication apparatus according to claim 1, wherein
   the auto-negotiation unit transmits and receives a speed at which communications can be performed between the network communication apparatus and said another apparatus, and sets the communication speed set at the network communication apparatus side when the link has been disconnected by the disconnecting unit, and
   the network communication apparatus further comprises a link establishing unit that establishes a link between the network communication apparatus and said another apparatus at the communication speed set by the self-apparatus setting unit.

3. The network communication apparatus according to claim 1, wherein the self-apparatus setting unit sets a speed that corresponds to both the network communication apparatus and said another apparatus and that is the lowest speed, as the communication speed.

4. The network communication apparatus according to claim 1, wherein at a time of further shifting from the energy-saving mode to a normal mode, the self-apparatus setting unit sets a speed that corresponds to both the network communication apparatus and said another apparatus connected to the network communication apparatus via the network and that is the highest speed, as the communication speed.

5. The network communication apparatus according to claim 4, wherein at a time of further shifting from a normal mode indicating a normal operation state to an energy-saving mode indicating an energy-saving state, the self-apparatus setting unit sets a speed that corresponds to both the network communication apparatus and said another apparatus connected to the network communication apparatus via the network and that is lower than a communication speed set in the normal mode, as a communication speed.

6. An image forming apparatus comprising the network communication apparatus according to claim 1.

7. A method of executing network communication comprising:
   setting by use of a self-apparatus setting unit a communication speed to be applied to communications between a network communication apparatus to which the self-apparatus setting unit belongs and another apparatus that is connected to the network communication apparatus via a network;
   transmitting and receiving a speed at which communications can be performed between the network communication apparatus and said another apparatus to set the communication speed previously set by the self-apparatus setting unit to a communication speed of said another apparatus;
   updating the communication speed, and updating a connection destination ability of network media information, after completion of said transmitting and receiving by an auto-negotiation unit;
   selecting an energy-saving communication speed based on a speed that the self-apparatus can meet and on the connection destination ability of network media information; and
   disconnecting a link between the network communication apparatus and the another apparatus, wherein the disconnecting shifts a physical layer to a loop back mode that is a state where data is transmitted to the network communication apparatus itself, thereby disconnecting the link.

8. A computer-readable recording medium that stores therein a computer program that causes a computer to execute:
   setting by use of a self-apparatus setting unit a communication speed to be applied to communications between a network communication apparatus to which the self-apparatus setting unit belongs and another apparatus that is connected to the network communication apparatus via a network; and
   transmitting and receiving a speed at which communications can be performed between the network communication apparatus and said another apparatus to set the communication speed previously set by the self-apparatus setting unit to a communication speed of said another apparatus;
   updating the communication speed, and updating a connection destination ability of network media information, after completion of said transmitting and receiving by an auto-negotiation unit; selecting an energy-saving communication speed based on a speed that the self-apparatus can meet and on the connection destination ability of network media information; and disconnecting a link between the network communication apparatus and the another apparatus, wherein the disconnecting shifts a physical layer to a loop back mode that is a state where data is transmitted to the network communication apparatus itself, thereby disconnecting the link.

* * * * *